(12) United States Patent
Yamamoto

(10) Patent No.: US 8,089,708 B2
(45) Date of Patent: Jan. 3, 2012

(54) LENS SYSTEM, OPTICAL DEVICE WITH LENS SYSTEM, AND METHOD OF MANUFACTURING LENS SYSTEM

(75) Inventor: Sayako Yamamoto, Kawasaki (JP)

(73) Assignee: Nikon Corporation, Tokyo (JP)

( * ) Notice: Subject to any disclaimer, the term of this patent is extended or adjusted under 35 U.S.C. 154(b) by 84 days.

(21) Appl. No.: 12/388,512

(22) Filed: Feb. 18, 2009

(65) Prior Publication Data

US 2009/0225444 A1  Sep. 10, 2009

Related U.S. Application Data

(60) Provisional application No. 61/140,043, filed on Dec. 22, 2008.

(30) Foreign Application Priority Data

Mar. 4, 2008  (JP) .............................. P2008-052772

(51) Int. Cl.
- *G02B 9/62* (2006.01)
- *G02B 9/60* (2006.01)
- *G02B 9/08* (2006.01)

(52) U.S. Cl. .......................... 359/761; 359/740; 359/770

(58) Field of Classification Search .................. 359/761, 359/770, 749–753
See application file for complete search history.

(56) References Cited

U.S. PATENT DOCUMENTS

| | | | | |
|---|---|---|---|---|
| 4,650,295 | A * | 3/1987 | Terasawa | 359/679 |
| 6,989,939 | B2 * | 1/2006 | Yamasaki et al. | 359/676 |
| 7,079,324 | B2 * | 7/2006 | Yamasaki | 359/680 |
| 7,215,477 | B2 * | 5/2007 | Yamasaki et al. | 359/649 |
| 7,417,802 | B2 * | 8/2008 | Horiuchi | 359/687 |
| 2002/0060858 | A1 * | 5/2002 | Wada | 359/739 |
| 2009/0109551 | A1 * | 4/2009 | Hatada | 359/753 |

FOREIGN PATENT DOCUMENTS

| | | |
|---|---|---|
| JP | 50-45627 | 4/1975 |
| JP | 54-99428 A | 8/1979 |
| JP | 63-61214 A | 3/1988 |
| JP | 08-160293 A | 6/1996 |
| JP | 2005-84456 A | 3/2005 |

* cited by examiner

*Primary Examiner* — Jordan Schwartz
(74) *Attorney, Agent, or Firm* — Miles & Stockbridge P.C.

(57) ABSTRACT

A lens system has the following components in order from an object side: one negative lens component; a positive lens component; a negative lens component having a concave surface of a large curvature on an image side; an aperture stop; a negative lens component having a concave surface of a large curvature on the object side; and a positive lens component; the lens system satisfies a condition of the following expression: $0.75 < SF1 < 1.60$, where $SF1 = (R1+R2)/(R1-R2)$, and where R1 is a radius of curvature of an object-side lens surface of the negative lens component located nearest to the object side, R2 is a radius of curvature of an image-side lens surface thereof, and SF1 is a shape factor thereof.

20 Claims, 10 Drawing Sheets

LENS SYSTEM, OPTICAL DEVICE WITH LENS SYSTEM, AND METHOD OF MANUFACTURING LENS SYSTEM

BACKGROUND OF THE INVENTION

1. Field of the Invention

The present invention relates to a lens system, an optical device with this lens system, and a method of manufacturing the lens system.

2. Related Background Art

For single-lens reflex cameras and others, there is a hitherto-known lens system with an angle of view of about 50° and of a Gauss type in which a negative lens is located on the object side (e.g., cf. Japanese Patent Application Laid-open No. 50-045627).

SUMMARY OF THE INVENTION

With spread of digital cameras, films have been replaced with image pickup devices such as CCDs or CMOSs in these years. In these digital cameras, preferably, angles of rays from a direction of a normal to an image pickup device are not so large, in order to suitably take light into the image pickup device. Namely, a length to the exit pupil (i.e., a distance on the optical axis between the image pickup surface and the exit pupil plane) needs to be long to a certain extent.

The lens system as disclosed in the foregoing Laid-open No. 50-045627, however, had the problem that the distance to the exit pupil was short or approximately half times the focal length and was not suitable for digital cameras.

The present invention has been accomplished in light of the problem as described above, and an object of the present invention is to provide a lens system with an angle of view of about 50° and a sufficiently long distance to the exit pupil as well compensated for various aberrations.

For purposes of summarizing the invention, certain aspects, advantages, and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessary achieving other advantages as may be taught or suggested herein.

In order to solve the above problem, a lens system according to the present invention comprises the following components in order from an object side: one negative lens component; a positive lens component; a negative lens component having a concave surface of a large curvature on an image side; an aperture stop; a negative lens component having a concave surface of a large curvature on the object side; and a positive lens component. The lens system satisfies a condition of the following expression: $0.75 < SF1 < 1.60$, where $SF1 = (R1+R2)/(R1-R2)$, and where R1 is a radius of curvature of an object-side lens surface of the negative lens component located nearest to the object side, R2 is a radius of curvature of an image-side lens surface of the negative lens component located nearest to the object side, and SF1 is a shape factor of the negative lens component located nearest to the object side.

In this lens system, preferably, the positive lens component located nearest to the image side satisfies a condition of the following expression: $-0.9 < SFi < -0.8$, where $SFi = (Ri1+Ri2)/(Ri1-Ri2)$, and where Ri1 is a radius of curvature of an object-side lens surface of the positive lens component located nearest to the image side, Ri2 is a radius of curvature of an image-side lens surface thereof, and SFi is a shape factor thereof.

The lens system preferably satisfies a condition of the following Expression: $0.5 < |Rs-1/Rs+1| < 1.5$, where Rs−1 is a radius of curvature of the concave surface of the negative lens component having the concave surface of the large curvature on the image side and Rs+1 is a radius of curvature of the concave surface of the negative lens component having the concave surface of the large curvature on the object side.

The lens system preferably comprises a positive lens component between the positive lens component located nearest to the image side and the negative lens component having the concave surface of the large curvature on the object side.

The lens system is preferably configured as follows: each of the negative lens component having the concave surface of the large curvature on the image side and the negative lens component having the concave surface of the large curvature on the object side is comprised of a cemented lens.

The lens system preferably comprises a plurality of positive lens components between the negative lens component located nearest to the object side and the negative lens component having the concave surface of the large curvature on the image side.

The lens system preferably satisfies a condition of the following expression: $1.0 < (-fn)/f < 2.3$, where fn is a focal length of the negative lens component located nearest to the object side and f is a focal length of an overall system of the lens system.

In the lens system, preferably, every optical element with a refracting power located on the image side with respect to the negative lens component having the concave surface of the large curvature on the object side, has a positive refracting power.

An optical device according to the present invention comprises any one of the above-described lens systems.

A manufacturing method of a lens system according to the present invention is a method of manufacturing a lens system, comprising a step of arranging, in order from an object side, one negative lens component, a positive lens component, a negative lens component having a concave surface of a large curvature on an image side, an aperture stop, a negative lens component having a concave surface of a large curvature on the object side, and a positive lens component, the lens system satisfying a condition of the following expression: $0.75 < SF1 < 1.60$, where $SF1 = (R1+R2)/(R1-R2)$, and where R1 is a radius of curvature of an object-side lens surface of the negative lens component located nearest to the object side, R2 is a radius of curvature of an image-side lens surface thereof, and SF1 is a shape factor thereof.

In this connection, an imaging method using the lens system as described above is preferably configured to move the aperture stop along the optical axis upon focusing.

As the lens system according to the present invention, the optical device with the lens system, and the manufacturing method of the lens system are configured as described above, the lens system and the optical device are provided with the angle of view of about 50° and the long distance to the exit pupil while well compensated for various aberrations.

DESCRIPTION OF THE PREFERRED EMBODIMENTS

Figure 1:
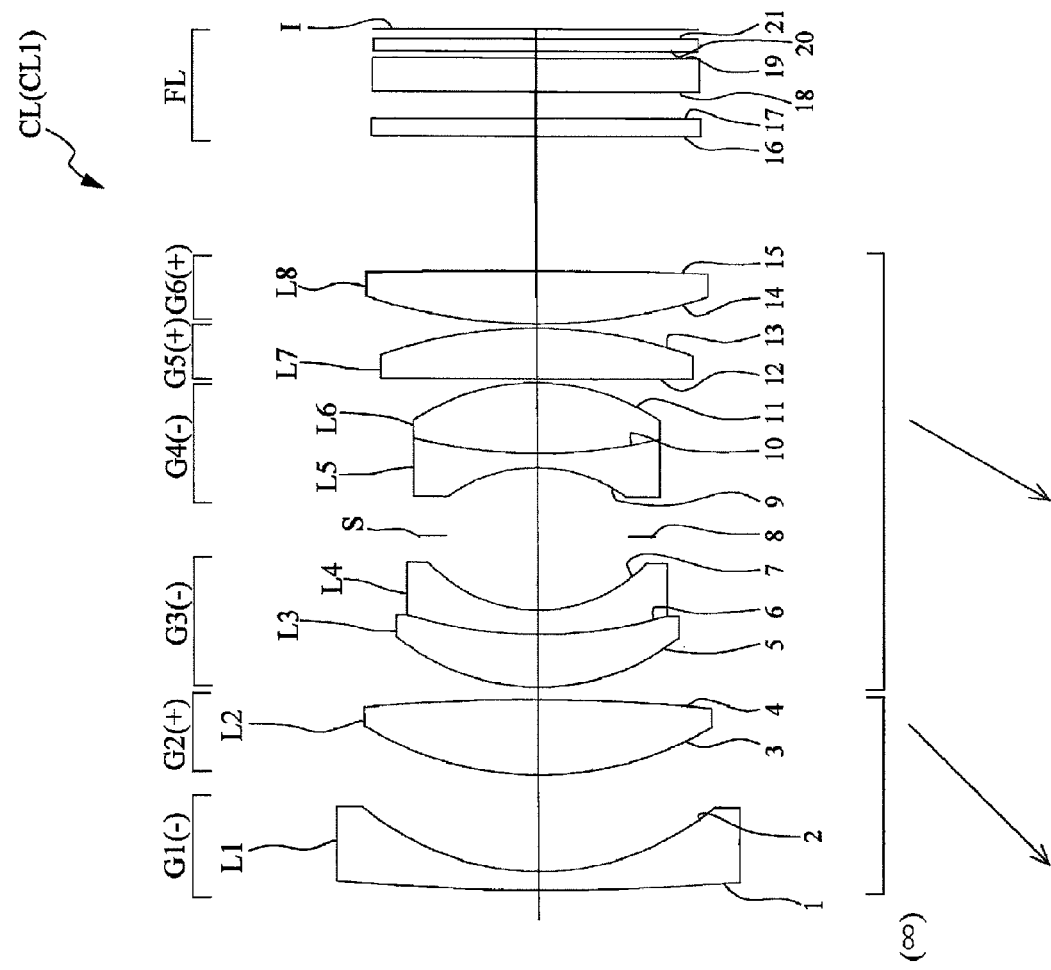
FIG. 1 is a sectional view showing a configuration of a lens system according to the first embodiment.

The preferred embodiments of the present invention will be described below with reference to the drawings. As shown in FIG. 1, a lens system CL according to the present invention is composed of the following components arranged along the optical axis and in the order named from the object side: a first lens unit G1 having one negative lens component; a second lens unit G2 having a positive lens component; a third lens unit G3 having a negative lens component with a concave surface of a large curvature on the image side, or concave surface an absolute value of a curvature of which is larger than an absolute value of a curvature of an object-side lens surface of the negative lens component; an aperture stop S; a fourth lens unit G4 having a negative lens component with a concave surface of a large curvature on the object side, or concave surface an absolute value of a curvature of which is larger than an absolute value of a curvature of an image-side lens surface of the negative lens component; a fifth lens unit G5 having a positive lens component; and a sixth lens unit G6 located nearest to the image side and having one positive lens component. When this configuration is adopted, the length to the exit pupil (distance on the optical axis between the image pickup surface and the exit pupil plane as described above) can be set long. Each of the lens components forming the lens units G1-G6 may be a single lens, or a cemented lens composed of two or more single lenses cemented together.

In the lens system CL of the configuration as described above, it is possible to omit the positive lens component (the fifth lens unit G5) disposed between the positive lens component located nearest to the image side (the sixth lens unit G6) and the negative lens component with the concave surface of the large curvature on the object side (the fourth lens unit G4), and it is also possible to arrange one positive lens component on the image side of the negative lens component with the concave surface of the large curvature on the object side, i.e., to arrange the sixth lens unit G6 on the image side of the fourth lens unit G4. When the positive lens component (fifth lens unit G5) is located between the negative lens component with the concave surface of the large curvature on the object side (the fourth lens unit G4) and the positive lens component located nearest to the image side (the sixth lens unit G6), this fifth lens unit G5 is preferably composed of one to three positive lens components, and in this case, each positive lens component is preferably a single lens. Furthermore, in this lens system CL, an optical system with a refracting power located on the image side of the negative lens component with the concave surface of the large curvature on the object side (the fourth lens unit G4) (the optical system is the fifth lens unit G5 and the sixth lens unit G6 in the case of FIG. 1) consists preferably of only a positive lens component.

In the lens system CL, each of the pair of negative lens components arranged on both sides of the aperture stop S (the negative lens component with the concave surface of the large curvature on the image side forming the third lens unit G3 and the negative lens component with the concave surface of the large curvature on the object side forming the fourth lens unit G4) is preferably constructed as a cemented lens consisting of a negative lens with a concave surface of a large curvature on the aperture stop S side (in the case of FIG. 1, negative meniscus lens L4 or biconcave lens L5) and a positive lens (in the case of FIG. 1, positive meniscus lens L3 or biconvex lens L6) which are cemented together. When each of these negative lens components (third lens unit G3 and fourth lens unit G4) is constructed as a cemented lens, the configuration becomes simpler. It also increases degrees of freedom for curvature of cemented surfaces and degrees of freedom for selection of materials of lenses. In this case, the cemented lens is more preferably a cemented lens in which a negative lens is located at a position where it is opposed to the aperture stop S.

In the lens system CL, the second lens unit G2 disposed between the negative lens component located nearest to the object side (the first lens unit G1) and the negative lens component with the concave surface of the large curvature on the image side (the third lens unit G3) is preferably composed of one to three positive lens components, and in this case, each positive lens component is preferably a single lens.

The first negative lens component (the first lens unit G1) may be a negative meniscus lens with a convex surface on the object side, or a biconcave lens. It may also be a cemented lens.

Now, the conditions for constructing the lens system CL as described above will be explained below. First, the lens system CL is configured to satisfy Condition (1) below where R1 is a radius of curvature of the object-side lens surface (the first surface in FIG. 1) of the negative lens component located nearest to the object side (the first lens unit G1, or negative meniscus lens in FIG. 1), R2 is a radius of curvature of the image-side lens surface thereof (the second surface in FIG. 1), and SF1 is a shape factor thereof.

$$0.75 < SF1 < 1.60 \quad (1),$$

where SF1=(R1+R2)/(R1−R2).

Condition 1 is a condition for defining the shape of the first negative lens component located nearest to the object side (the first lens unit G1). If the shape factor is less than the lower limit of Condition (1), it will become difficult to correct for coma aberration, particularly, lower coma aberration at large angles of view, and it is thus unfavorable. On the other hand, if the shape factor is more than the upper limit of Condition (1), it will become difficult to correct for spherical aberration, and it is thus unfavorable. For more securely achieving the effect of the present embodiment, it is desirable to set the lower limit of Condition (1) to 0.80 and the upper limit thereof to 1.55.

In the lens system CL of the present embodiment, the positive lens component located nearest to the image side (the sixth lens unit G6) desirably satisfies Condition (2) below where Ri1 is a radius of curvature of the object-side lens surface (the fourteenth surface in FIG. 1) of the positive lens component (biconvex lens L8 in FIG. 1), Ri2 is a radius of curvature of the image-side lens surface thereof (the fifteenth surface in FIG. 1), and SFi is a shape factor thereof.

$$-0.9 < SFi < -0.8 \quad (2),$$

where SFi=(Ri1+Ri2)/(Ri1−Ri2).

Condition (2) is a condition for defining the shape of the positive lens component located nearest to the image side (the sixth lens unit G6). When satisfying Condition (2), the positive lens component located nearest to the image side (the final lens) has the shape in which a convex surface is located on the object side and the curvature on the image plane side is small. This shape enables compensation for aberration in the case where the exit pupil is set farther. If the shape factor is more than the upper limit of Condition (2), the radius of curvature on the image plane side will become smaller and it will become difficult to correct for spherical aberration; therefore, it is not favorable. On the other hand, if the shape factor is less than the lower limit of Condition (2), it will become difficult to correct for upper coma and it is thus unfavorable.

The lens system CL desirably further satisfies Condition (3) below where $Rs-1$ is a radius of curvature of the concave surface (the seventh surface being the image-side surface of the negative meniscus lens L4 in FIG. 1) of the negative lens component with the concave surface of the large curvature on the image side (the third lens unit G3), and $Rs+1$ is a radius of curvature of the concave surface (the ninth surface being the object-side surface of the biconcave lens L5 in FIG. 1) of the negative lens component with the concave surface of the large curvature on the object side (the fourth lens unit G4).

$$0.5 < |Rs-1/Rs+1| < 1.5 \quad (3)$$

Condition (3) is a condition for defining a ratio of radii of curvature of the mutually opposed concave surfaces of the negative lens components arranged on both sides of the aperture stop S (the third lens unit G3 and the fourth lens unit G4). When the ratio satisfies this Condition (3), symmetry becomes higher of the concave surfaces of large curvatures arranged on both sides of the aperture stop S and it becomes feasible to correct for various aberrations. As the value of Condition (3) approaches 1.0, it becomes easier to maintain the symmetry of the concave surfaces of large curvatures arranged on both sides of the aperture stop S and it becomes feasible to well correct, particularly, for spherical aberration. For more securely achieving the effect of the present embodiment, it is desirable to set the lower limit of Condition (3) to 0.8 and the upper limit thereof to 1.3.

The lens system CL desirably satisfies Condition (4) below where fn is a focal length of the negative lens component located nearest to the object side (the negative meniscus lens L1 of the first lens unit G1) and f is a focal length of the overall system of the lens system CL.

$$1.0 < (-fn)/f < 2.3 \quad (4)$$

Condition (4) is a condition for defining a ratio of the focal length of the negative lens component located nearest to the object side (the first lens unit G1) to the focal length of the overall system of the lens system CL. If the ratio is more than the upper limit of Condition (4), the size of the overall system will increase in the case where the pupil plane is located apart from the image plane; therefore, it is not preferred. On the other hand, if the ratio is less than the lower limit of Condition (4), the power of the first negative lens component (the first lens unit G1) will become strong enough to develop potential for downsizing, whereas the positive power before the aperture stop S except for the first negative lens component will become relatively stronger to make compensation for distortion difficult; it is thus unfavorable. For more securely achieving the effect of the present embodiment, it is desirable to set the lower limit of Condition (4) to 1.1 and the upper limit thereof to 2.0.

The lens system CL of the present embodiment is constructed as a focusing lens group to implement focusing from an infinity object to a short-range object by moving a lens component alone or two or more lens components, or a part of a lens component along the direction of the optical axis. In this case, the focusing lens group is also applicable to autofocus and also suitably applicable to driving of a motor for autofocus (e.g., an ultrasonic motor). In such focusing, the aperture stop S is preferably configured to move along the optical axis.

The lens system CL of the present embodiment is a standard lens whose focal length in terms of 35 mm film size is approximately 35-60 mm. The lens system CL of the present embodiment is more preferably configured as follows: the minimum distance between the image-side surface of the positive lens component located nearest to the image side (the sixth lens unit G6) and the image plane (i.e., the back focus) is approximately 10-30 mm.

The contents described below can be optionally adopted without impairing the optical performance.

First, a lens surface may be an aspherical surface. In this case, the aspherical surface may be any one of an aspherical surface made by grinding, a glass mold aspherical surface made of glass in aspherical shape by a mold, and a composite aspherical surface made of resin in aspherical shape on a surface of glass. The aspherical surface is preferably applied to the object-side lens surface of the final lens component (biconvex lens L8 forming the sixth lens unit G6 in FIG. 1) or to the concave surfaces before and after the aperture stop S. A lens surface may be a diffracting surface, and a lens may be a gradient index lens (GRIN lens) or a plastic lens.

The aperture stop S is preferably arranged between the negative lens component with the concave surface of the large curvature on the image side (the third lens unit G3) and the negative lens component with the concave surface of the large curvature on the object side (the fourth lens unit G4), but the aperture stop does not always have to be provided as a separate member and may be replaced with a lens frame to function as an aperture stop.

Furthermore, each lens surface may be provided with an antireflection coating having high transmittance over a wide wavelength region, whereby high optical performance can be achieved with high contrast while reducing flares and ghosts.

Figure 9:
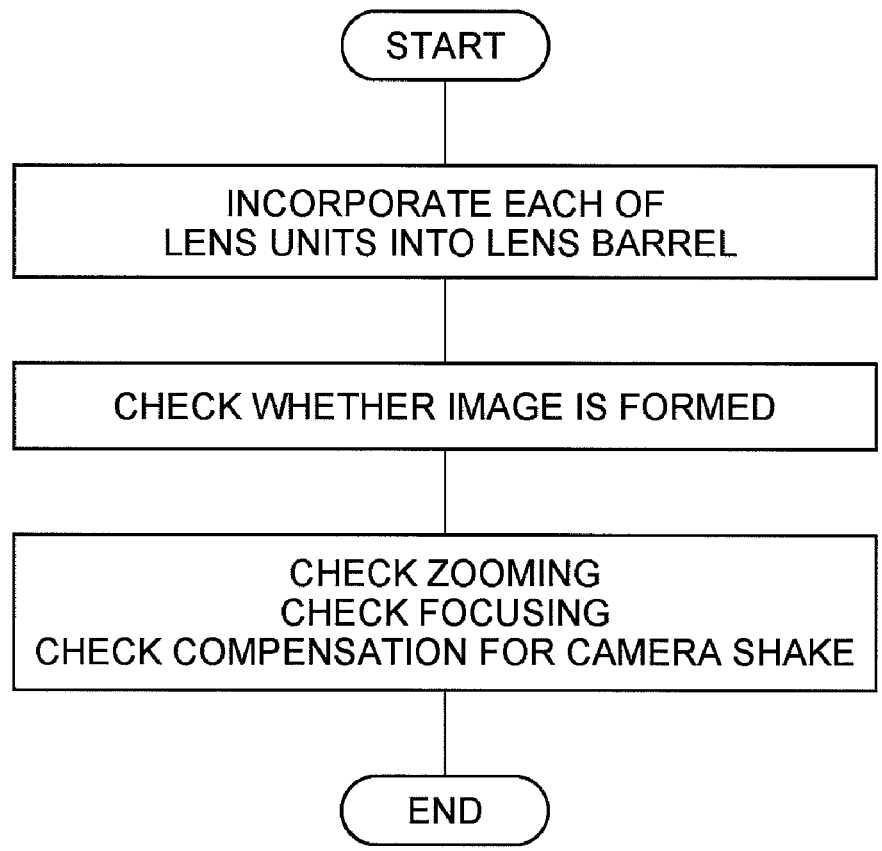
FIG. 9 is a flowchart of a method of manufacturing a lens system according to an embodiment.

A method of manufacturing the lens system will be briefly described below with reference to FIG. 9.

First, each of the lenses is incorporated into a cylindrical lens barrel. On the occasion of incorporating the lenses into the lens barrel, the assembly process may be arranged to incorporate the lenses one by one in order along the optical axis into the lens barrel, or to first integrally hold some or all of the lenses by a holding member and then incorporate them into the lens barrel member. In the lens system of the present embodiment, the following lenses are arranged in the order named from the object side: the first lens unit G1 having one negative lens component; the second lens unit G2 having the positive lens component; the third lens unit G3 having the negative lens component with the concave surface of the large curvature on the image side; the aperture stop S; the fourth lens unit G4 having the negative lens component with the concave surface of the large curvature on the object side; and the sixth lens unit G6 having the positive lens component. After incorporating the lenses into the lens barrel, it is preferable to check whether an image of an object is formed in the assembled state of the lens units in the lens barrel.

After completion of the assembly of the lens system as described above, various operations of the lens system are checked. Examples of the various operations include a focusing operation for the lens units for focusing from a far object to a near object to move along the optical-axis direction, a camera shake compensation operation for at least one of the lenses to move so as to have components in directions orthogonal to the optical axis, and so on. The order of checking the various operations may be optionally determined.

Figure 7A:
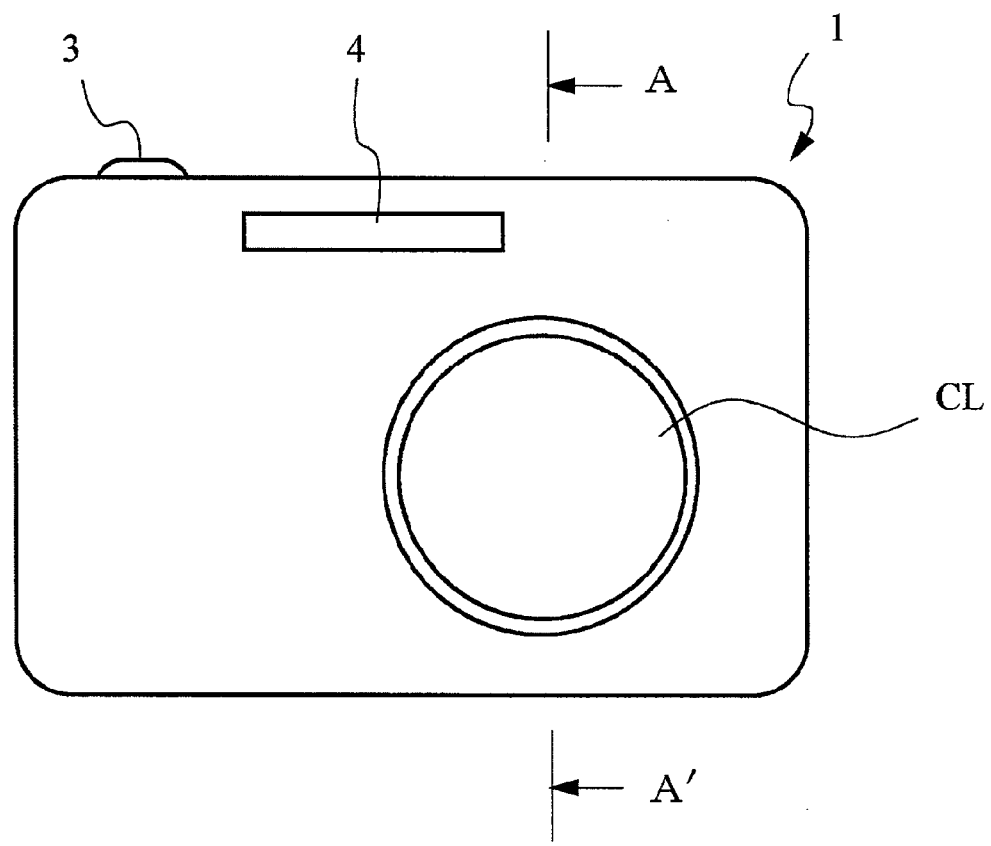
FIG. 7A is a front view of an digital still camera equipped with a lens system according to the present invention.
Figure 7B:
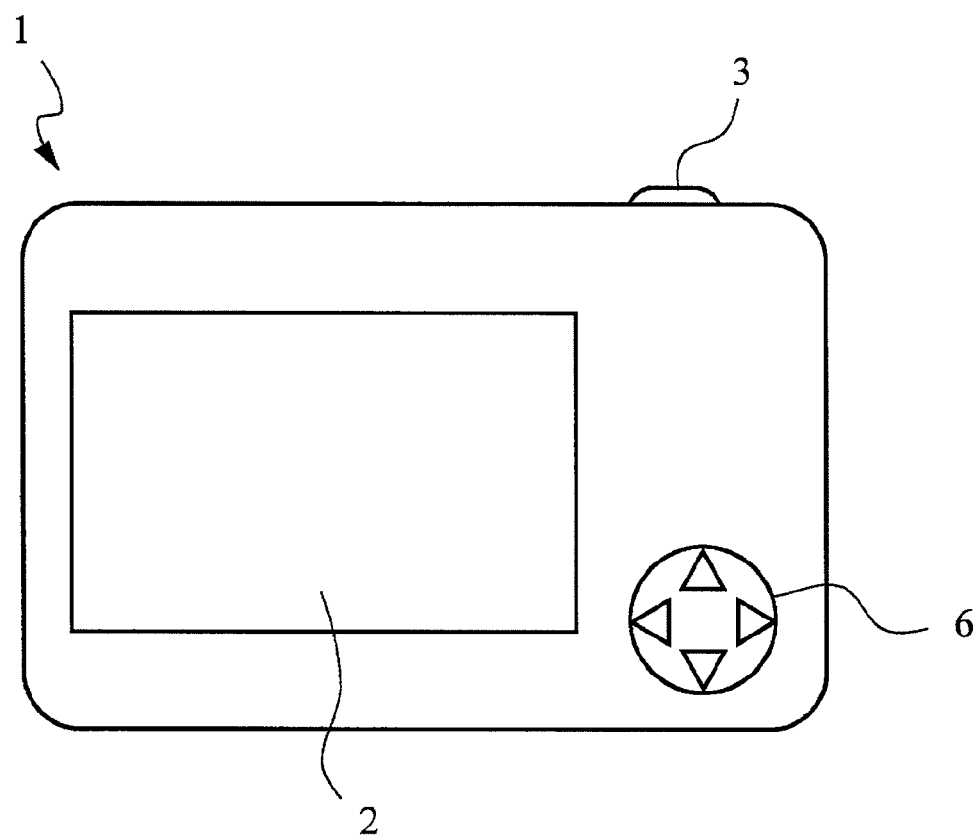
FIG. 7B is a back view of the digital still camera equipped with the lens system according to the present invention.
Figure 8:
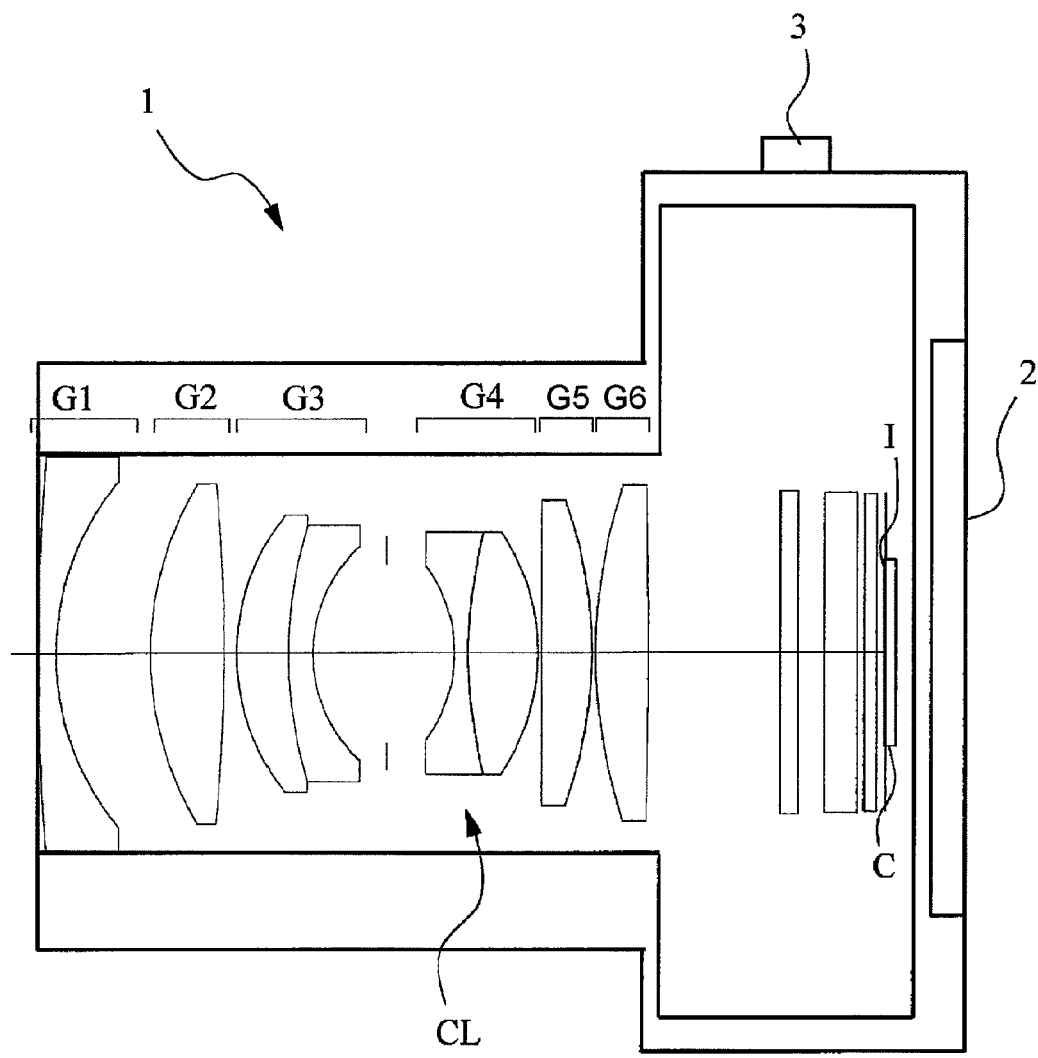
FIG. 8 is a sectional view along line A-A' in FIG. 7A.

FIGS. 7A, 7B, and 8 show a configuration of an digital still camera 1 (which will be referred to hereinafter simply as a camera) as an optical device with the above-described lens system CL. This camera 1 operates as follows. When a photographer pushes an unrepresented power button, an unrepresented shutter of the lens system CL is opened and this lens system CL collects light from a subject not shown, to form an image thereof on an image pickup device C (e.g., a CCD or CMOS) arranged on the image plane I. The subject image formed on the image pickup device C is displayed on a liquid crystal monitor 2 located on the back of the camera 1. The photographer determines a composition of the subject image on the liquid crystal monitor 2 and then depresses a release button 3 to take the subject image by the image pickup device C and record and store the image in an unrepresented memory.

This camera 1 is equipped with such components as an auxiliary light emitter 4 to emit auxiliary light to a dark subject, a function button 6 to be used for setting of various conditions of the camera 1 and others, and so on.

For easier understanding, the present invention was described above with the constituent features of the embodiment, but it should be noted that the present invention is by no means intended to be limited to it.

Embodiments

Figure 3:
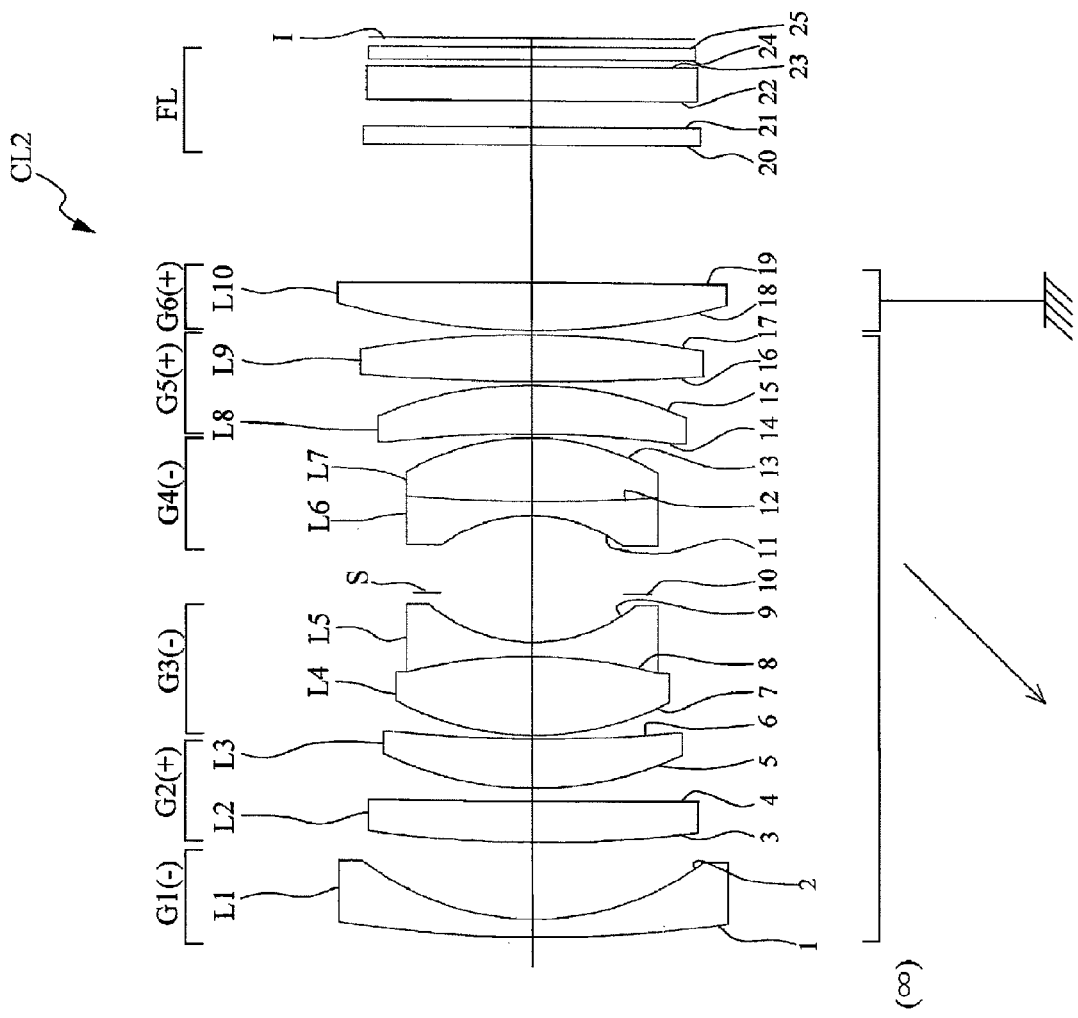
FIG. 3 is a sectional view showing a configuration of a lens system according to the second embodiment.
Figure 5:
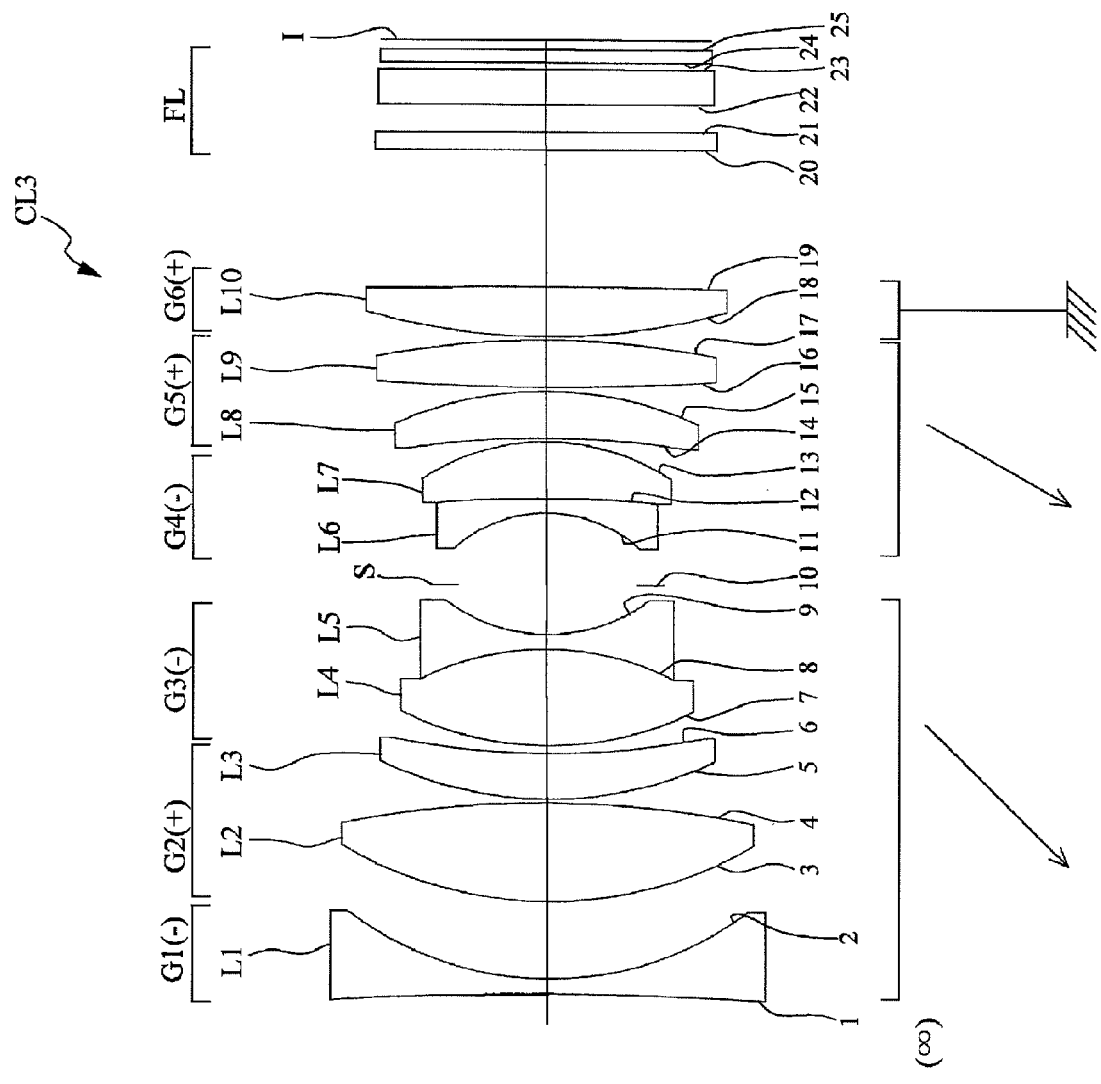
FIG. 5 is a sectional view showing a configuration of a lens system according to the third embodiment.

Each of embodiments of the present invention will be described below on the basis of the drawings. FIGS. 1, 3, and 5 are sectional views showing configurations of lens systems CL (CL1-CL3) of respective embodiments and arrows therein indicate directions of movement of their lens units along the optical axis upon focusing from infinity to a near object in the focusing operation of these lens systems CL1-CL3. As shown in FIGS. 1, 3, and 5, each of the lens system CL1-CL3 of the respective embodiments is composed of the following components arranged along the optical axis and in the order named from the object side, as described above: a first lens unit G1 consisting of one negative lens component; a second lens unit G2 having a positive lens component; a third lens unit G3 consisting of a negative lens component with a concave surface of a large curvature on the image side; an aperture stop S; a fourth lens unit G4 consisting of a negative lens component with a concave surface of a large curvature on the object side; a fifth lens unit G5 having a positive lens component; a sixth lens unit G6 consisting of one positive lens component; and a filter set FL. The filter set FL is composed of a low-pass filter, an infrared cut filter, and so on. The image plane I is in focus with the image pickup device C (e.g., a film, CCD, or CMOS), as shown in FIG. 8.

First Embodiment

FIG. 1 is a drawing showing the configuration of the lens system CL1 according to the first embodiment of the present invention. In this lens system CL1 of FIG. 1, the first lens unit G1 is composed of one negative meniscus lens L1 with a convex surface on the object side; the second lens unit G2 is composed of a biconvex positive lens L2; the third lens unit G3 is composed of a cemented lens of a positive meniscus lens L3 with a convex surface on the object side and a negative meniscus lens L4 with a concave surface of a large curvature on the image side which are cemented together in the order named from the object side; the fourth lens unit G4 is composed of a cemented lens of a biconcave lens L5 with a concave surface of a large curvature on the object side and a biconvex lens L6 which are cemented together in the order named from the object side; the fifth lens unit G5 is composed of a positive meniscus lens L7 with a convex surface on the image side; the sixth lens unit G6 is composed of a biconvex lens L8.

Table 1 below presents values of specifications of the first embodiment. In this Table 1, f represents the focal length, FNO the F number, and 2ω the angle of view. Furthermore, the surface number represents an order of a lens surface from the object side along a ray traveling direction, the surface distance a spacing on the optical axis between each optical surface and a next optical surface, and the refractive index and Abbe number values for the d line ($\lambda$=587.6 nm). It is noted herein that "mm" is commonly used as the unit of focal length f, radius of curvature, surface distance, and other lengths listed in all the specification values below, but the unit does not always have to be limited to it because equivalent optical performance is also achieved when the optical system is proportionally enlarged or reduced. The radius of curvature of 0.0000 indicates a plane and the refractive index of air of 1.00000 is omitted. The same notation of these symbols and description of the specification table also apply to the embodiments hereinafter. In the following tables, s, r, d, n, and v denote the Surface No., Radius of curvature, Surface distance, Refractive index, and Abbe number, respectively.

TABLE 1 f = 18.4
F. NO = 1.41
2ω = 50.39
Image height = 8.50
Total lens length = 48.00
Position of exit pupil from image plane = −41.45

| s | r | d | n | v |
|---|---|---|---|---|
| 1 | 145.5187 | 1.0000 | 1.63980 | 34.47 |
| 2 | 15.4491 | 5.3679 | | |
| 3 | 19.0803 | 4.1720 | 1.81600 | 46.62 |
| 4 | −97.5071 | (d1) | | |
| 5 | 12.5873 | 2.9537 | 1.88300 | 40.76 |
| 6 | 25.8743 | 1.3636 | 1.58144 | 40.75 |
| 7 | 8.4240 | 4.1109 | | |
| 8 | 0.0000 | 3.8528 | | (aperture stop) |
| 9 | −8.4657 | 0.8000 | 1.84666 | 23.78 |
| 10 | 29.5380 | 3.9532 | 1.69680 | 55.53 |
| 11 | −12.2593 | 0.2000 | | |
| 12 | −5668.6643 | 2.8710 | 1.88300 | 40.76 |
| 13 | −25.4387 | 0.2000 | | |
| 14 | 30.3775 | 3.0034 | 1.88300 | 40.76 |
| 15 | −352.0344 | (d2) | | |
| 16 | 0.0000 | 1.0000 | 1.51680 | 64.10 |
| 17 | 0.0000 | 1.5000 | | |
| 18 | 0.0000 | 1.8700 | 1.51680 | 64.10 |
| 19 | 0.0000 | 0.4000 | | |
| 20 | 0.0000 | 0.7000 | 1.51680 | 64.10 |
| 21 | 0.0000 | 0.5000 | | |

In this first embodiment, the lens system CL1 is so configured that upon focusing from infinity to a near object the first lens unit G1 and the second lens unit G2 move together along the optical axis and the third to sixth lens units G3-G6 move together along the optical axis. For this reason, the axial aerial gap d1 between the second lens unit G2 and the third lens unit G3 and the axial aerial gap d2 between the sixth lens unit G6 and the filter set FL vary during the focusing. Table 2 below shows the varying gaps at infinity and at an object-image distance (400 mm). The lens units are so configured that in the focusing the moving speed of the first and second lens units G1, G2 is larger than the moving speed of the third to sixth lens units G3-G6.

TABLE 2

|    | at infinity | at object-image distance (400 mm) |
|----|-------------|------------------------------------|
| d1 | 0.681       | 0.317                              |
| d2 | 7.5         | 8.5                                |

Table 3 below presents values corresponding to the respective conditions in the first embodiment. In this Table 3, SF1 represents the shape factor defined by (R1+R2)/(R1−R2). In this definition, R1 represents the radius of curvature of the object-side lens surface (the first surface in FIG. 1) of the negative meniscus lens L1 located nearest to the object side and R2 the radius of curvature of the image-side lens surface (the second surface in FIG. 1) of the negative meniscus lens L1. Furthermore, SFi represents the shape factor defined by (Ri1+Ri2)/(Ri1−Ri2). In this definition, Ri1 represents the radius of curvature of the object-side lens surface (the fourteenth surface in FIG. 1) of the biconvex positive lens L8 located nearest to the image side and Ri2 the radius of curvature of the image-side lens surface (the fifteenth surface in FIG. 1) of the biconvex positive lens L8. Rs−1 represents the radius of curvature of the concave surface (the seventh surface in FIG. 1) of the negative meniscus lens L4 with the concave surface of the large curvature on the image side and Rs+1 the radius of curvature of the concave surface (the ninth surface in FIG. 1) of the biconcave lens L5 with the concave surface of the large curvature on the object side. Furthermore, fn represents the focal length of the negative lens component (the first lens unit G1) located nearest to the object side and f the focal length of the overall system of the lens system CL1.

TABLE 3

| (1) | SF1 = 1.24              |
|-----|-------------------------|
| (2) | SFi = −0.84             |
| (3) | |Rs − 1/Rs + 1| = 0.995 |
| (4) | (−fn/f) = 1.47          |

Figure 2:
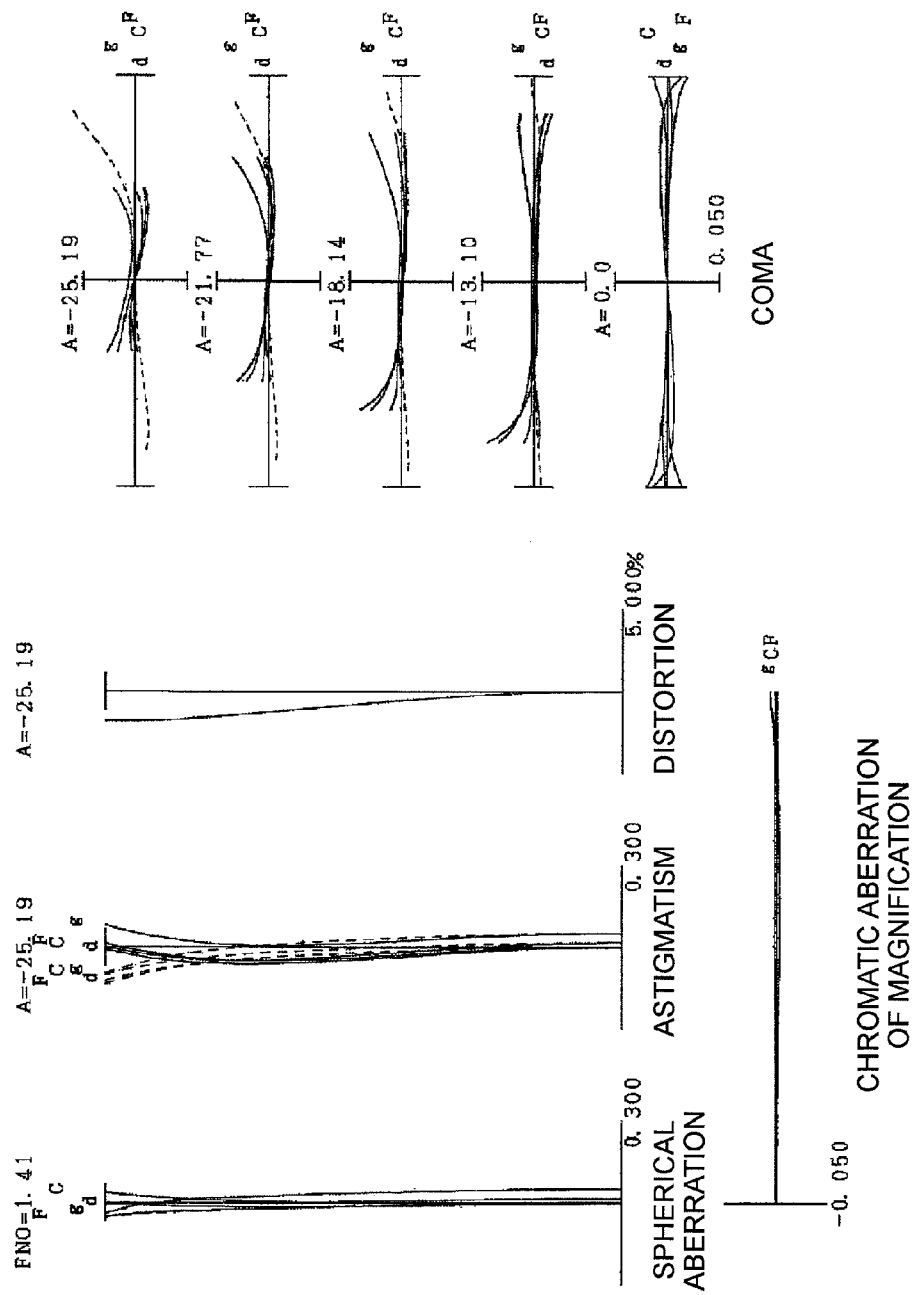
FIG. 2 is various aberration diagrams in an infinity in-focus state of the first embodiment.

FIG. 2 shows aberration diagrams in an infinity in-focus state of the first embodiment. In each aberration diagram, FNO indicates the F number, A a half angle of view at each image height, d the d line (λ=587.6 nm), g the g line (λ=435.6 nm), C the C line (λ=656.3 nm), and F the F line (λ=486.1 nm). In the aberration diagram showing astigmatism, solid lines indicate sagittal image surfaces and dashed lines meridional image surfaces. Furthermore, in the aberration diagram showing spherical aberration, solid lines indicate spherical aberrations and a dashed line the sine condition. This definition for the aberration diagrams also applies to the embodiments hereinafter. It is evident from the aberration diagrams that the lens system CL1 in the first embodiment is well corrected for the various aberrations and has excellent imaging performance.

Second Embodiment

FIG. 3 is a drawing showing the configuration of the lens system CL2 according to the second embodiment of the present invention. In this lens system CL2 of FIG. 3, the first lens unit G1 is composed of one negative meniscus lens L1 with a convex surface on the object side; the second lens unit G2 is composed of a positive meniscus lens L2 with a convex surface on the object side and a positive meniscus lens L3 with a convex surface on the object side; the third lens unit G3 is composed of a cemented lens of a biconvex lens L4 and a biconcave lens L5 with a concave surface of a large curvature on the image side which are cemented together in the order named from the object side; the fourth lens unit G4 is composed of a cemented lens of a biconcave lens L6 with a concave surface of a large curvature on the object side and a biconvex lens L7 which are cemented together in the order named from the object side; the fifth lens unit G5 is composed of a positive meniscus lens L8 with a convex surface on the image side and a biconvex lens L9; the sixth lens unit G6 is composed of a biconvex lens L10.

Table 4 below presents values of specifications of the second embodiment.

TABLE 4 f = 18.4
F. NO = 1.41
2ω = 50.31
Image height = 8.50
Total lens length = 50.17
Position of exit pupil from image plane = −55.91

| s  | r          | d       | n       | ν              |
|----|------------|---------|---------|----------------|
| 1  | 75.4163    | 1.0000  | 1.56384 | 60.67          |
| 2  | 15.7160    | 4.2734  |         |                |
| 3  | 70.5341    | 2.2903  | 1.88300 | 40.76          |
| 4  | 731.4542   | 0.7225  |         |                |
| 5  | 19.1812    | 2.7503  | 1.88300 | 40.76          |
| 6  | 84.1167    | 0.2000  |         |                |
| 7  | 16.3750    | 4.4071  | 1.83481 | 42.71          |
| 8  | −28.3247   | 0.8000  | 1.66680 | 33.05          |
| 9  | 9.0641     | 2.7262  |         |                |
| 10 | 0.0000     | 4.9154  |         | (aperture stop)|
| 11 | −8.5939    | 0.8000  | 1.84666 | 23.78          |
| 12 | 96.7989    | 3.5648  | 1.74320 | 49.34          |
| 13 | −13.4605   | 0.2000  |         |                |
| 14 | −67.1614   | 2.7139  | 1.88300 | 40.76          |
| 15 | −21.6875   | 0.2000  |         |                |
| 16 | 139.6261   | 2.6087  | 1.81600 | 46.62          |
| 17 | −52.8255   | (d1)    |         |                |
| 18 | 41.0564    | 2.6903  | 1.81600 | 46.62          |
| 19 | −617.9847  | 7.6915  |         |                |
| 20 | 0.0000     | 1.0000  | 1.51680 | 64.12          |
| 21 | 0.0000     | 1.5000  |         |                |
| 22 | 0.0000     | 1.8700  | 1.51680 | 64.12          |
| 23 | 0.0000     | 0.4000  |         |                |
| 24 | 0.0000     | 0.7000  | 1.51680 | 64.12          |
| 25 | 0.0000     | 0.5000  |         |                |

In this second embodiment, the lens system CL2 is so configured that upon focusing from infinity to a near object the sixth lens unit G6 is fixed and the first to fifth lens units G1-G5 move together along the optical axis. For this reason, the axial aerial gap d1 between the fifth lens unit G5 and the sixth lens unit G6 varies during the focusing. Table 5 below shows the varying gap at infinity and at an object-image distance (400 mm).

TABLE 5

|    | at infinity | at object-image distance (400 mm) |
|----|-------------|------------------------------------|
| d1 | 0.234       | 2.067                              |

Table 6 below presents values corresponding to the respective conditions in the second embodiment. In this Table 6, the notation of symbols is the same as that in the first embodiment. In the second embodiment, R1 represents the radius of curvature of the object-side lens surface (the first surface in FIG. 3) of the negative meniscus lens L1 located nearest to the object side and R2 the radius of curvature of the image-side lens surface (the second surface in FIG. 3) of the negative meniscus lens L1. Furthermore, Ri1 represents the radius of curvature of the object-side lens surface (the eighteenth surface in FIG. 3) of the biconvex lens L10 located nearest to the image side and Ri2 the radius of curvature of the image-side lens surface (the nineteenth surface in FIG. 3) of the biconvex lens L1. Rs−1 represents the radius of curvature of the concave surface (the ninth surface in FIG. 3) of the biconcave lens L5 with the concave surface of the large curvature on the image side and Rs+1 the radius of curvature of the concave surface (the eleventh surface in FIG. 3) of the biconcave lens L6 with the concave surface of the large curvature on the object side.

TABLE 6

| | |
|---|---|
| (1) | SF1 = 1.53 |
| (2) | SFi = −0.88 |
| (3) | |Rs − 1/Rs + 1| = 1.055 |
| (4) | (−fn/f) = 1.93 |

Figure 4:
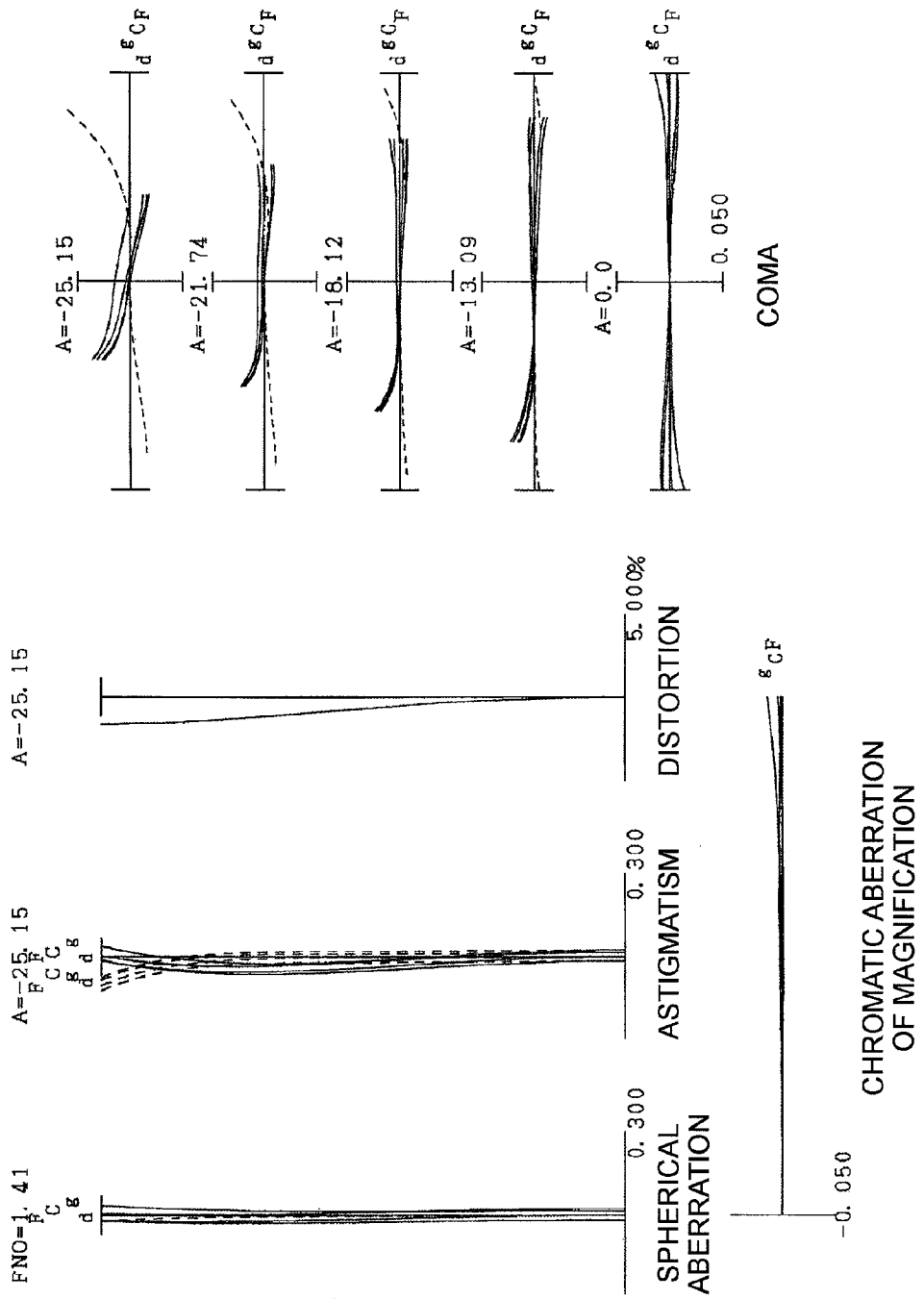
FIG. 4 is various aberration diagrams in an infinity in-focus state of the second embodiment.

FIG. 4 shows aberration diagrams in an infinity in-focus state of the second embodiment. It is evident from the aberration diagrams that the lens system CL2 in the second embodiment is well corrected for the various aberrations and has excellent imaging performance.

Third Embodiment

FIG. 5 is a drawing showing the configuration of the lens system CL3 according to the third embodiment of the present invention. In this lens system CL3 of FIG. 5, the first lens unit G1 is composed of one biconcave lens L1; the second lens unit G2 is composed of a biconvex lens L2 and a positive meniscus lens L3 with a convex surface on the object side; the third lens unit G3 is composed of a cemented lens of a biconvex lens L4 and a biconcave lens L5 with a concave surface of a large curvature on the image side which are cemented together in the order named from the object side; the fourth lens unit G4 is composed of a cemented lens of a negative meniscus lens L6 with a concave surface of a large curvature on the object side and a positive meniscus lens L7 with a convex surface on the image side which are cemented together in the order named from the object side; the fifth lens unit G5 is composed of a positive meniscus lens L8 with a convex surface on the image side and a biconvex lens L9; the sixth lens unit G6 is composed of a biconvex lens L10.

Table 7 below presents values of specifications of the third embodiment.

TABLE 7 f = 18.4
F. NO = 1.41
2ω = 50.29
Image height = 8.50
Total lens length = 52.00
Position of exit pupil from image plane = −46.38

| s | r | d | n | ν |
|---|---|---|---|---|
| 1 | −188.2024 | 0.8000 | 1.72916 | 54.68 |
| 2 | 18.1673 | 4.2292 | | |
| 3 | 22.4450 | 5.3522 | 1.77250 | 49.60 |
| 4 | −56.7984 | 0.2000 | | |
| 5 | 21.4436 | 2.4934 | 1.83400 | 37.16 |
| 6 | 43.7411 | 0.4192 | | |
| 7 | 17.9535 | 5.2572 | 1.60311 | 60.64 |

TABLE 7-continued f = 18.4
F. NO = 1.41
2ω = 50.29
Image height = 8.50
Total lens length = 52.00
Position of exit pupil from image plane = −46.38

| s | r | d | n | ν |
|---|---|---|---|---|
| 8 | −15.4934 | 0.8000 | 1.61293 | 37.00 |
| 9 | 9.2953 | 2.7000 | | |
| 10 | 0.0000 | (d1) | | (aperture stop) |
| 11 | −7.6612 | 0.8000 | 1.84666 | 23.78 |
| 12 | −72.7188 | 3.0963 | 1.88300 | 40.76 |
| 13 | −12.3644 | 0.2000 | | |
| 14 | −51.3524 | 2.5665 | 1.81600 | 46.62 |
| 15 | −20.0394 | 0.2000 | | |
| 16 | 133.2347 | 2.5741 | 1.75500 | 52.32 |
| 17 | −48.2728 | (d2) | | |
| 18 | 37.5368 | 2.7066 | 1.72916 | 54.68 |
| 19 | −454.7809 | 7.5000 | | |
| 20 | 0.0000 | 1.0000 | 1.51680 | 64.10 |
| 21 | 0.0000 | 1.5000 | | |
| 22 | 0.0000 | 1.8700 | 1.51680 | 64.10 |
| 23 | 0.0000 | 0.4000 | | |
| 24 | 0.0000 | 0.7000 | 1.51680 | 64.10 |
| 25 | 0.0000 | 0.5000 | | |

In this third embodiment, the lens system CL3 is so configured that upon focusing from infinity to a near object the sixth lens is fixed, the first to third lens units G1-G3 move together along the optical axis, and the fourth and fifth lens units G4, G5 move together along the optical axis. The aperture stop S is configured to move along with the third lens unit G3. For this reason, the axial aerial gap d1 between the aperture stop S and the fourth lens unit G4 and the axial aerial gap d2 between the fifth lens unit G5 and the sixth lens unit G6 vary during the focusing. Table 5 below shows the varying gaps at infinity and at an object-image distance (400 mm). The lens units are so configured that in the focusing the moving speed of the first to third lens units G1-G3 is larger than the moving speed of the fourth and fifth lens units G4, G5.

TABLE 8

| | at infinity | at object-image distance (400 mm) |
|---|---|---|
| d1 | 3.96 | 4.37 |
| d2 | 0.2 | 2.04 |

Table 9 below presents values corresponding to the respective conditions in the third embodiment. In this Table 8, the notation of symbols is the same as that in the first embodiment. In the third embodiment, R1 represents the radius of curvature of the object-side lens surface (the first surface in FIG. 5) of the biconcave lens L1 located nearest to the object side and R2 the radius of curvature of the image-side lens surface (the second surface in FIG. 5) of the biconcave lens L1. Furthermore, Ri1 represents the radius of curvature of the object-side lens surface (the eighteenth surface in FIG. 5) of the biconvex lens L10 located nearest to the image side and Ri2 the radius of curvature of the image-side lens surface (the nineteenth surface in FIG. 5) of the biconvex positive lens L10. Rs−1 represents the radius of curvature of the concave surface (the ninth surface in FIG. 5) of the biconcave lens L5 with the concave surface of the large curvature on the image side and Rs+1 the radius of curvature of the concave surface (the eleventh surface in FIG. 5) of the negative meniscus lens L6 with the concave surface of the large curvature on the object side.

TABLE 9

| (1) | SF1 = 0.82 |
| --- | --- |
| (2) | SFi = −0.85 |
| (3) | \|Rs − 1/Rs + 1\| = 1.213 |
| (4) | (−fn/f) = 1.23 |

Figure 6:
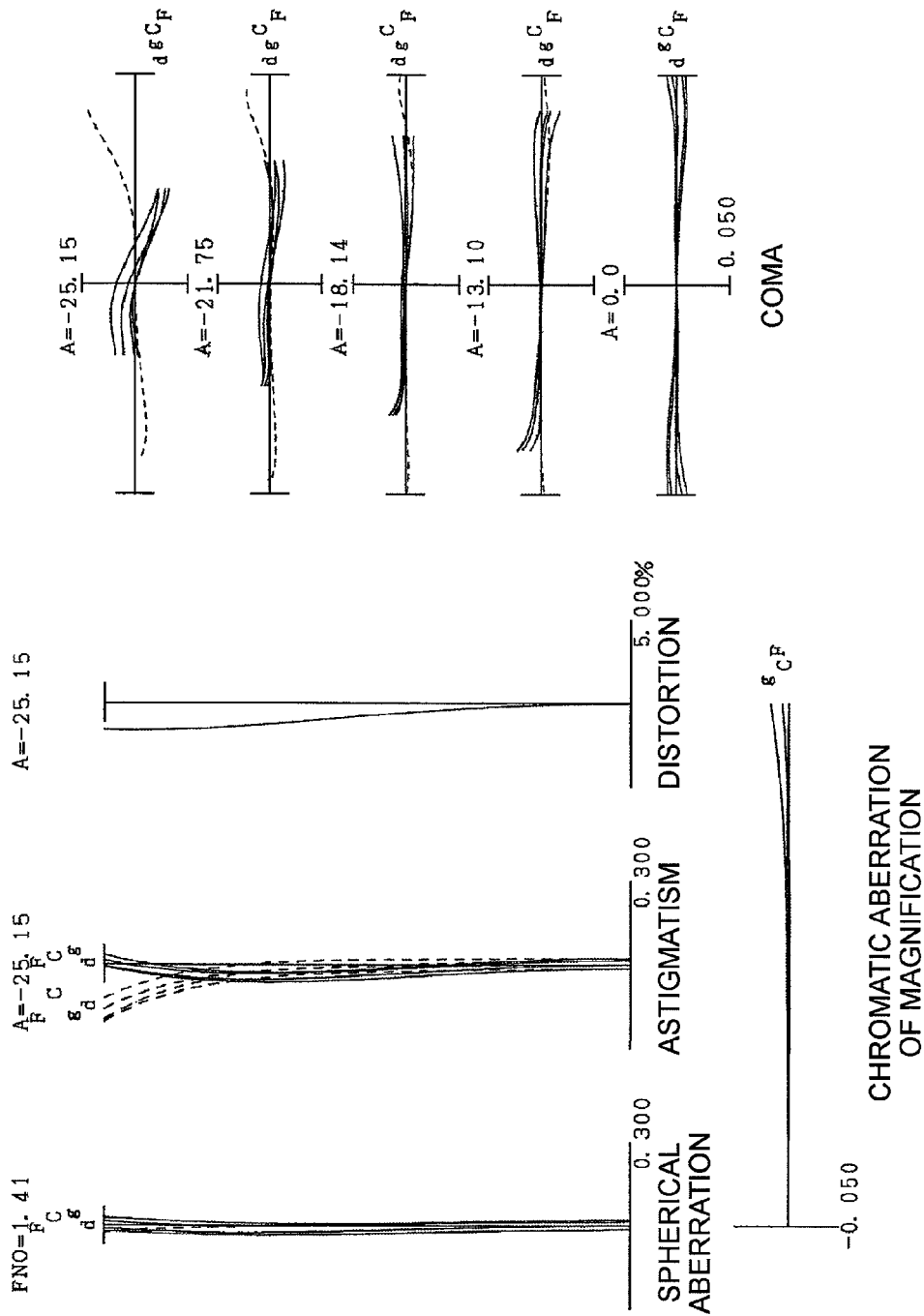
FIG. 6 is various aberration diagrams in an infinity in-focus state of the third embodiment.

FIG. 6 shows aberration diagrams in an infinity in-focus state of the third embodiment. It is evident from the aberration diagrams that the lens system CL3 in the third embodiment is well corrected for the various aberrations and has excellent imaging performance.

The invention is not limited to the foregoing embodiments but various changes and modifications of its components may be made without departing from the scope of the present invention. Also, the components disclosed in the embodiments may be assembled in any combination for embodying the present invention. For example, some of the components may be omitted from all components disclosed in the embodiments. Further, components in different embodiments may be appropriately combined.

What is claimed is:

1. A lens system comprising the following components in order from an object side:
    a first negative lens component being a most object-side lens component of the lens system;
    at least one positive lens component;
    a second negative lens component having a concave surface on an image side thereof, the concave surface having a smaller radius of curvature than an object-side surface of the second negative lens component;
    an aperture stop;
    a third negative lens component having a concave surface on the object side thereof, the concave surface having a smaller absolute value of the, radius of curvature than an image-side surface of the third negative lens component; and
    at least one positive lens component, including a positive lens component being a most image-side lens component of the lens system,
    the aperture stop being disposed with no intervening lens component between the aperture stop and the concave surface of the second negative lens component and no intervening lens component between the aperture stop and the concave surface of the third negative lens component;
    the lens system satisfying the following conditional expressions:

$0.75 < SF1 < 1.60$, $0.5 < |Rs-1/Rs+1| < 1.3$, where SF1=(R1+R2)/(R1−R2),
    where R1 is a radius of curvature of an object-side lens surface of the first negative lens component, R2 is a radius of curvature of an image-side lens surface of the first negative lens component, and SF1 is a shape factor of the first negative lens component, and
    where Rs−1 is a radius of curvature of the concave surface of the second negative lens component and Rs+1 is a radius of curvature of the concave surface of the third negative lens component.

2. A lens system according to claim 1, wherein the most image-side positive lens component satisfies the following conditional expression:

$-0.9 < SFi < -0.8$, where SFi=(Ri1+Ri2)/(Ri1−Ri2), and where Ri1 is a radius of curvature of an object-side lens surface of the most image-side positive lens component, Ri2 is a radius of curvature of an image-side lens surface thereof, and SFi is a shape factor thereof.

3. A lens system according to claim 1, comprising a positive lens component between the most image-side positive lens component and the third negative lens component.

4. A lens system according to claim 1, wherein each of the second negative lens component and the third negative lens component is comprised of a cemented lens.

5. A lens system according to claim 1, comprising a plurality of positive lens components between the first negative lens component and the second negative lens component.

6. A lens system according to claim 1, satisfying the following conditional expression:

$1.0 < (-fn)/f < 2.3$, where fn is a focal length of the first negative lens component and f is a focal length of an overall system of the lens system.

7. A lens system according to claim 1, wherein every optical element with a refracting power located on the image side with respect to the third negative lens component has a positive refracting power.

8. An optical device comprising the lens system as set forth in claim 1.

9. A method of manufacturing a lens system, comprising a step of arranging, in order from an object side, a first negative lens component being a most object-side lens component of the lens system, at least one positive lens component, a second negative lens component having a concave surface on an image side thereof with a smaller radius of curvature than an object-side surface of the second negative lens component, an aperture stop, a third negative lens component having a concave surface on an object side thereof with a smaller absolute value of the radius of curvature than an image-side surface thereof, and at least one positive lens component including a positive lens component being a most image-side lens component of the lens system, the aperture stop being disposed with no intervening lens component between the aperture stop and the concave surface of the second negative lens component and no intervening lens component between the aperture stop and the concave surface of the third negative lens component;
    the lens system satisfying the following conditional expressions:

$0.75 < SF1 < 1.60$, $0.5 < |Rs-1/Rs+1| < 1.3$, where SF1=(R1+R2)/(R1−R2), and
    where R1 is a radius of curvature of an object-side lens surface of the first negative lens component, R2 is a radius of curvature of an image-side lens surface thereof, and SF1 is a shape factor thereof, and
    where Rs−1 is a radius of curvature of the concave surface of the second negative lens component and Rs+1 is a radius of curvature of the concave surface of the third negative lens component.

10. A method according to claim 9, wherein the most image-side positive lens component satisfies the following conditional expression:

$-0.9 < SFi < -0.8$, where SFi=(Ri1+Ri2)/(Ri1−Ri2), and
    where Ri1 is a radius of curvature of an object-side lens surface of said most image-side positive lens component, Ri2 is a radius of curvature of an image-side lens surface thereof, and SFi is a shape factor thereof.

11. A method according to claim 9, comprising arranging a positive lens component between the positive lens component located nearest to the image side and the third negative lens component.

12. A method according to claim 9, wherein each of the second negative lens component and the third negative lens component is comprised of a cemented lens.

13. A method according to claim 9, comprising arranging a plurality of positive lens components between the first negative lens component the second negative lens component.

14. A method according to claim 9, satisfying the following conditional expression:

$$1.0<(-fn)/f<2.3,$$

where fn is a focal length of the first negative lens component and f is a focal length of an overall system of the lens system.

15. A method according to claim 9, wherein every optical element with a refracting power located on the image side with respect to the third negative lens component has a positive refracting power.

16. An optical device comprising the lens system manufactured by the method as set forth in claim 9.

17. A lens system comprising the following components in order from an object side:
a first negative lens component being a most object-side lens component of the lens system;
at least one positive lens component;
a second negative lens component having a concave surface on an image side thereof, the concave surface having a smaller radius of curvature than an object-side surface of the second negative lens component;
an aperture stop;
a third negative lens component having a concave surface on the object side thereof, the concave surface having a smaller absolute value of the radius of curvature than an image-side surface of the third negative lens component; and
at least one positive lens component, including a positive lens component being a most image-side lens component of the lens system,
the aperture stop being disposed with no intervening Lens component between the aperture stop and the concave Surface of the second negative lens component and no Intervening lens component between the aperture stop and the Concave surface of the third negative lens component;
the lens system satisfying the following conditional expression:

$$0.75<SF1<1.60,$$

where $SF1=(R1+R2)/(R1-R2)$, and
where R1 is a radius of curvature of an object-side lens surface of the first negative lens component, R2 is a radius of curvature of an image-side lens surface of the first negative lens component, and SF1 is a shape factor of the first negative lens component, and
wherein said most image-side positive lens component satisfies the following conditional expression:

$$-0.9<SFi<-0.8,$$

where $SFi=(Ri1+Ri2)/(Ri1-Ri2)$, and
where Ri1 is a radius of curvature of an object-side surface of said most image-side positive lens component, Ri2 is a radius of curvature of an image-side surface thereof, and SFi is a shape factor thereof.

18. The lens system according to claim 17, satisfying the following conditional expression:

$$0.5<|Rs-1/Rs+1|<1.5,$$

wherein Rs−1 is a radius of curvature of the concave surface of the second negative lens component and Rs+1 is a radius of curvature of the concave surface of the third negative lens component.

19. The lens system according to claim 17 wherein each of the second negative lens component and the third negative lens component is comprised of a cemented lens.

20. The lens system according to claim 17 satisfying the following conditional expression:

$$1.0<(-fn)/f<2.3,$$

where fn is a focal length of the first negative lens component and f is a focal length of an overall system of the lens system.

* * * * *